United States Patent Office 3,214,490
Patented Oct. 26, 1965

3,214,490
PROCESS FOR ACCELERATING POLYMERIZATION OF ETHYLENICALLY UNSATURATED COMPOUNDS USING ORGANOTIN MERCAPTOESTERS
John R. Leebrick, Roselle Park, and Norman Kudisch, South Amboy, N.J., assignors, by mesne assignments, to M & T Chemicals Inc., New York, N.Y., a corporation of Delaware
No Drawing. Filed Aug. 26, 1960, Ser. No. 52,043
6 Claims. (Cl. 260—863)

The present invention is directed to a process for accelerating the polymerization of unsaturated monomers and of partially polymerized resins containing unsaturated centers which are polymerized in a final cure during a forming operation.

Various peroxides are used to catalyze the polymerization of monomers and partially polymerized resins containing ethylenically-unsaturated groups. The polymerization rate may be regulated by control of the temperature and the amount of catalyst added. The cure rates for different resins vary widely. For many industrial applications and, in particular, for forming operations, it is desirable to have a rapid cure. Various materials, and most successfully cobalt naphthenates, have been used to accelerate peroxide catalyzed polymerization. Cobalt naphthenate lends a violet color to the cured resin, making it unsuitable for use in clear formulations. A need exists for more rapid polymerization than obtained when using cobalt naphthenate.

The object of this invention is to provide a process for rapid polymerization of ethylenically-unsaturated monomers and partially polymerized resins, and to the cured compositions prepared using this process.

We discovered that polymerization of unsaturated monomers and resin systems containing residual unsaturation are accelerated when a small amount of an organotin mercaptoester is used as the accelerator, in conjunction with a hydroperoxide catalyst. The effective organotin mercaptoesters have the general formula

$R_2Sn(SR'COOR'')_2$ wherein R is selected from the group consisting of alkyl and monocyclic aryl radicals having up to 18 carbon atoms. R' is an alkylene radical having 1 to 7 carbon atoms, and R'' is hydrogen or a hydrocarbon residue of a mono- or polybasic alcohol (generally containing up to 18 carbon atoms). Illustrative R groups are methyl, propyl, butyl, isobutyl, octyl, lauryl, octadecyl, phenyl, benzyl, chlorophenyl, methylphenyl, vinylphenyl; other illustrative equivalent R groups may include vinyl and oleyl; R' groups are methylene, ethylene, butylene; R'' groups are hydrogen, octyl, glyceryl, pentaerythrityl, cetyl, butyl, propyl, ethyl and methyl. The useful organotin mercaptoesters are not limited to the simple compounds illustrated by the above formula. Equivalent monomers such as those where the two R groups are joined, as well as polymeric reaction products of diorganotin compounds are also operative. The internal mercaptoacid esters of diorganotins such as the polymeric reaction product of dibutyltin oxide and β-mercaptopropionic acid, in a one to one mole ratio, are also equivalents. Preferred R groups are the alkyl and monocyclic aryl compounds having not more than 7 carbon atoms; the preferred R' group has 1 or 2 carbon atoms; while the preferred R'' groups are hydrogen and alcohol residues having 1 to 8 carbon atoms. Preferred organotin mercaptoesters are dibutyltin S,S'-bis-isooctylmercaptoacetate, dimethyltin S,S'-bis-isooctylmercaptoacetate, and dioctyltin S,S'-bis-octylmercaptoacetate. Although the entire class of organotin mercaptoesters functions as accelerators, their efficacy is dependent upon the particular compounds used as well as the monomer or resin and catalyst system selected. The preferred accelerator for a particular application is dependent upon the resin catalyst system and is influenced by such accelerator characteristics as solubility and compatibility in the system.

The organotin mercaptoesters are effective accelerators for resin systems catalyzed by hydroperoxides (peroxides characterized by having one or more terminal OOH groups). Methylethylketone peroxide and cumene hydroperoxide are the hydroperoxides in widest commercial use. Other useful hydroperoxides include cyclohexanone peroxide, t-butyl hydroperoxide, p-menthane hydroperoxide, pinane hydroperoxide, and 2,5-dimethylhexane-2,5-dihydroperoxide. The organotin mercaptoesters do not function as accelerators with materials catalyzed with benzoyl peroxide.

The organotin mercaptoesters accelerate the hydroperoxide catalyst curing of a wide range of ethylenically-unsaturated resins. They are effective with the so-called polyester (alkyd) and polyester-styrene resins. Polyesters are the reaction products of polycarboxylic acids and polyhydric alcohols. The more commonly used materials are the dicarboxylic acids and dihydroxy alcohols, e.g. maleic acid (or anhydride) and ethylene glycol. Polyesters used with a cross-linking agent such as styrene are generally formed from an unsaturated acid such as maleic acid. Ethylene and propylene glycols are the usual alcohols utilized. These are resins containing ethylenically-unsaturated compounds, such as styrene, to achieve a cross-linked structure when cured. Other unsaturated materials, e.g., diallylphthalate and triallylcyanurate and the methacrylates, are sometimes used in place of styrene. These polyester-styrene resins have a wide range of utility and are prepared with different formulations for different applications. The rate of curing varies greatly, dependent upon the residual unsaturation. Resins of this type are discussed in "Polyesters and Their Applications" by Bjorksten Research Labs, Inc., Reinhold Publishing Co. (1956). The organotin mercaptoesters also accelerate the hydroperoxide catalyzed polymerization of resins prepared from such ethylenically-unsaturated monomers as styrene, isoprene, butadiene, chloroprene, acrylates and methacrylates, etc. They are also effective with resins prepared from comonomers such as butadiene-styrene, etc. The organotin mercaptoesters are also useful to accelerate the polymerization of rubber.

The monomers and the partially polymerized resins are generally liquids and when a catalyst (with or without accelerator) is added, there is an initial period with no perceptible effect upon the viscosity of the liquid, followed by a definite gelling effect. The gel slowly hardens. Generally the gel time and the completion of the cure are shortened by raising the temperature. The use of small and relatively critical amounts of the organotin mercaptoesters shortens the gel time and/or the time necessary for final cure. In some instances the cured resin prepared with the organotin mercaptoester as an accelerator is not as hard as desired. This can be corrected by using a small amount of cobalt naphthenate in conjunction with the organotin mercaptoester. The amount used is much less than would be used if the cobalt naphthenate were used as the sole accelerator.

The amount of the specific organotin mercaptoester utilized in a given application is dependent upon the resin-catalyst system. Too large an amount acts to inhibit polymerization. Generally between about 0.1% and 0.2% by weight based on the weight of the resin is effective to accelerate the curing rate. Amounts below about 0.05% do not perceptibly accelerate the curing rate.

For the purpose of giving those skilled in the art a better understanding of the invention, the following illustrative examples are given. In the control experiments, the resins or monomers were prepared and polymerized utilizing the catalyst without any accelerator. Similar samples were cured utilizing the noted organotin mercapto-esters alone or in conjunction with cobalt naphthenate. The liquid resin was placed in a small test tube. Following the addition of catalyst and accelerator, the test tube was continuously observed. The onset of gelation (gel time) is apparent visually when an attempt is made to agitate or pour the liquid. In the examples in the table, for purposes of convenience, the compound dibutyltin S,S'-bis-isooctylmercaptoacetate is designated as Compound A.

Table

| Example No. | Resin or Monomer | Catalyst (1%) | Accelerator | Heat Cure |
|---|---|---|---|---|
| 1 | p-Chlorostyrene | Methylethylketone peroxide (0.5%) | | No cure 15 min. at 90° C. |
| 2 | do | do | Compound A (0.05%) | Gels 5 min. at 90° C. |
| 3 | Tributyltin methacrylate | do | | No cure 15 min. at 90° C. |
| 4 | do | Methylethylketone peroxide | Compound A (0.05%) | Gels 5 min. at 90° C. |

*Example 5*

A reactive polyester (alkyd) was prepared by reacting 1.1 moles of diethylene glycol with 1 mole of maleic anhydride for 5 hours at a temperature between 160–173° C. 70 parts of the polyester where then dissolved in 30 parts of inhibited monomeric styrene solution to form a fluid polyester styrene resin. The resin was polymerized with 1% methylethylketone peroxide. Gel time was 80 minutes at 25° C. A similar sample was polymerized with 1% of methylethylketone peroxide plus 0.15% of dibutyltin S,S'-bis-isooctylmercaptoacetate. Gel time was 15 minutes at 25° C.

The advantages utilizing the accelerators of the present invention include additional speed of polymerization. They also permit greater latitude and formulation to obtain desired properties. Where a sufficient rate of polymerization is obtained with known catalysts, it is possible to obtain the same rate utilizing lesser amounts of catalyst. This is important where excessive amounts of catalyst are undesirable because of cost, or effect on other resin properties.

As many embodiments of this invention may be made without departing from the spirit and scope thereof, it is to be understood that the invention includes all such modifications and variations as come within the scope of the appended claims.

We claim:

1. In the process of catalyzing with a hydroperoxide catalyst, the polymerization of a material selected from the group consisting of ethylenically-unsaturated resins, ethylenically-unsaturated monomers, and mixtures thereof, the improvement comprising accelerating the rate of polymerization by incorporating therein between about 0.05% and 0.2% of a compound having the formula $R_2Sn(SR'COOR'')_2$, wherein R is selected from the group consisting of alkyl and monocyclic aryl radicals having 1 to 8 carbon atoms, R' is an alkylene radical having 1 to 7 carbon atoms, and R'' is selected from the group consisting of hydrogen and saturated alcohol residues having 1 to 18 carbon atoms.

2. In the process of catalyzing with a hydroperoxide catalyst, the polymerization of a material selected from the group consisting of ethylenically-unsaturated resins, ethylenically-unsaturated monomers, and mixtures thereof, the improvement comprising accelerating the rate of polymerization by incorporating therein between about 0.1% and 0.2% of an accelerator compound having the formula $R_2Sn(SR'COOR'')_2$, wherein R is selected from the group consisting of alkyl and monocyclic aryl radicals having 1 to 8 carbon atoms, R' is an alkylene radical having 1 to 2 carbon atoms, and R'' is selected from the group consisting of hydrogen and saturated alcohol residues having 1 to 18 carbon atoms.

3. The process of claim 2 in which the hydroperoxide is methylethylketone peroxide.

4. The process of claim 2 in which the hydroperoxide is cumene hydroperoxide.

5. The process of claim 2 in which the accelerator compound is dibutyltin S,S'-bis-isooctylmercaptoacetate.

6. The process of claim 2 in which the accelerator compound is dimethyltin S,S'-bis-isooctylmercaptoacetate.

References Cited by the Examiner

UNITED STATES PATENTS

| 2,234,076 | 3/41 | Gumlich et al. | 260—82.5 |
| 2,380,475 | 7/45 | Stewart | 260—84.1 |
| 2,467,527 | 4/49 | Harris | 260—863 |
| 2,789,102 | 4/57 | Weinberg | 260—45.75 |

FOREIGN PATENTS

| 457,049 | 5/49 | Canada. |

OTHER REFERENCES

"Styrene—Its Polymers, Copolymers and Derivatives," by Boundy-Boyer, pub. 1952, by Reinhold Publishing Company, page 241.

WILLIAM H. SHORT, *Primary Examiner.*

LEON J. BERCOVITZ, *Examiner.*